US012802565B2

(12) United States Patent
Shibasaki

(10) Patent No.: US 12,802,565 B2
(45) Date of Patent: Nov. 17, 2026

(54) INFORMATION GENERATION DEVICE, INFORMATION GENERATION METHOD, AND PROGRAM FOR INFORMATION GENERATION DEVICE

(71) Applicant: PIONEER CORPORATION, Tokyo (JP)

(72) Inventor: Hiroaki Shibasaki, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 27 days.

(21) Appl. No.: 18/333,802

(22) Filed: Jun. 13, 2023

(65) Prior Publication Data

US 2023/0326339 A1 Oct. 12, 2023

Related U.S. Application Data

(63) Continuation of application No. 16/651,612, filed as application No. PCT/JP2018/033740 on Sep. 12, 2018, now Pat. No. 11,705,000.

(30) Foreign Application Priority Data

Sep. 29, 2017 (JP) ................................ 2017-192044

(51) Int. Cl.
*G08G 1/0967* (2006.01)
*G08G 1/16* (2006.01)

(52) U.S. Cl.
CPC . *G08G 1/096741* (2013.01); *G08G 1/096791* (2013.01); *G08G 1/161* (2013.01)

(58) Field of Classification Search
CPC ........... B60K 6/46; B60R 16/02; B60R 25/24; B60W 30/00; B60W 30/09; B60W 30/10;
(Continued)

(56) References Cited

U.S. PATENT DOCUMENTS 9,105,189 B2 * 8/2015 Rubin .................... H04W 4/06
10,796,577 B2 10/2020 Katou et al.
(Continued)

FOREIGN PATENT DOCUMENTS

JP 2008-11343 A 1/2008
JP 2014-59651 A 4/2014
(Continued)

OTHER PUBLICATIONS

International Search Report for related International Application No. PCT/JP2018/033740, mailed on Nov. 13, 2018; English translation provided (4 pages).

*Primary Examiner* — Stephen R Burgdorf
(74) *Attorney, Agent, or Firm* — PROCOPIO, CORY, HARGREAVES & SAVITCH LLP

(57) ABSTRACT

An information generation device mountable on a mobile body includes at least one memory configured to store a program, and a central processing unit (CPU) coupled to the memory and configured to execute a program to acquire moving environment information concerning a moving environment the in which the mobile body moves, and generate information for transmission transmitted to another mobile body, the information for transmission including mobile body information of an item prioritized according to the moving environment information among a plurality of items concerning the mobile body.

9 Claims, 14 Drawing Sheets

(58) Field of Classification Search

CPC ..... B60W 50/14; B60W 60/001; G01C 21/26; G01C 21/28; G05D 1/0027; G05D 1/02; G06T 7/73; G08G 1/005; G08G 1/0112; G08G 1/09; G08G 1/096725; G08G 1/096741; G08G 1/096791; G08G 1/161; G08G 1/164; G08G 1/20

USPC .......................................................... 340/902

See application file for complete search history.

(56) References Cited

U.S. PATENT DOCUMENTS

| | | | | |
|---|---|---|---|---|
| 10,875,544 | B2 * | 12/2020 | Narita | B60W 60/0016 |
| 10,891,861 | B2 * | 1/2021 | Wakisaka | G08G 1/096741 |
| 2004/0138809 | A1 | 7/2004 | Mukaiyama | |
| 2007/0040700 | A1 * | 2/2007 | Bachelder | G08G 1/087 340/902 |
| 2009/0001986 | A1 | 1/2009 | Besson et al. | |
| 2009/0295558 | A1 | 12/2009 | Kameyama | |
| 2015/0199905 | A1 * | 7/2015 | Hayee | G08G 1/096716 701/118 |
| 2015/0256663 | A1 | 9/2015 | Takikawa | |
| 2015/0310738 | A1 * | 10/2015 | Karacan | G08G 1/096783 701/117 |
| 2016/0189068 | A1 | 6/2016 | Amano et al. | |
| 2016/0242223 | A1 | 8/2016 | Brahmi et al. | |
| 2016/0247394 | A1 | 8/2016 | Stenneth | |
| 2016/0295624 | A1 | 10/2016 | Novlan et al. | |
| 2017/0072957 | A1 | 3/2017 | Nemoto | |
| 2017/0151945 | A1 * | 6/2017 | Torii | G08G 1/0112 |
| 2017/0158196 | A1 | 6/2017 | Park et al. | |
| 2017/0184407 | A1 * | 6/2017 | Yamashiro | G09B 29/106 |
| 2017/0243485 | A1 * | 8/2017 | Rubin | H04W 4/46 |
| 2017/0274827 | A1 | 9/2017 | Lewis et al. | |
| 2018/0059669 | A1 | 3/2018 | Madigan et al. | |
| 2018/0113460 | A1 | 4/2018 | Koda et al. | |
| 2018/0126976 | A1 * | 5/2018 | Naserian | B60W 10/06 |
| 2018/0151066 | A1 * | 5/2018 | Oba | G05D 1/247 |
| 2018/0188746 | A1 | 7/2018 | Lesher et al. | |
| 2018/0315314 | A1 * | 11/2018 | Gilsenan | B60W 30/18163 |
| 2019/0043357 | A1 | 2/2019 | Stinnett | |
| 2019/0053267 | A1 | 2/2019 | Kim et al. | |
| 2019/0139406 | A1 | 5/2019 | Adachi et al. | |
| 2020/0070834 | A1 | 3/2020 | Mizoguchi | |
| 2020/0245109 | A1 | 7/2020 | Yang et al. | |

FOREIGN PATENT DOCUMENTS

| | | | |
|---|---|---|---|
| JP | 2014-81872 | A | 5/2014 |
| JP | 2017-19421 | A | 1/2017 |
| WO | 2016/80452 | A1 | 5/2016 |
| WO | 2016/152873 | A1 | 9/2016 |

* cited by examiner

| ITEM ID | NUMBER OF TIMES OF RECEPTION | NUMBER OF TIMES OF USE |
|---|---|---|
| 000000001 | 123 | 23 |
| 000000002 | 21 | 5 |
| 000000003 | 654 | 10 |

FIG.7

| | CONTROL ITEM | DATA SIZE |
|---|---|---|
| ESSENTIAL ITEM | HIGH-ACCURACY POSITION INFORMATION | 15 |
| | CONTROL ATTRIBUTE LEVEL | 3 |
| OPTION ITEM | LANE KEEP FUNCTION STATE | 3 |
| | VEHICLE DISTANCE KEEP FUNCTION STATE | 5 |
| | PRECEDING VEHICLE FOLLOWING FUNCTION STATE | 4 |

FIG.9

| | CONTROL ITEM | DATA SIZE |
|---|---|---|
| ESSENTIAL ITEM | DRIVER STATE | 5 |
| | PERIPHERAL VEHICLE INFORMATION | 4 |
| | CONTROL ATTRIBUTE LEVEL | 3 |
| OPTION ITEM | DESTINATION INFORMATION | 3 |
| | ROUTE INFORMATION | 9 |
| | DRIVING SUPPORT INFORMATION 1 | 3 |
| | DRIVING SUPPORT INFORMATION 2 | 3 |

FIG.10

| | CONTROL ITEM | DATA SIZE |
|---|---|---|
| ESSENTIAL ITEM | HIGH-ACCURACY POSITION INFORMATION | 15 |
| | CONTROL ATTRIBUTE LEVEL | 3 |
| OPTION ITEM | ON/OFF OF LIGHT | 1 |
| | LANE KEEP FUNCTION STATE | 3 |
| | VEHICLE DISTANCE KEEP FUNCTION STATE | 5 |
| | PRECEDING VEHICLE FOLLOWING FUNCTION STATE | 4 |

FIG.13

| | CONTROL ITEM | DATA SIZE |
|---|---|---|
| ESSENTIAL ITEM | DRIVER STATE | 5 |
| | PERIPHERAL VEHICLE INFORMATION | 4 |
| | CONTROL ATTRIBUTE LEVEL | 3 |
| OPTION ITEM | ON/OFF OF WINDSHIELD WIPER | 2 |
| | DESTINATION INFORMATION | 3 |
| | ROUTE INFORMATION | 9 |
| | DRIVING SUPPORT INFORMATION 1 | 3 |
| | DRIVING SUPPORT INFORMATION 2 | 3 |

FIG14

INFORMATION GENERATION DEVICE, INFORMATION GENERATION METHOD, AND PROGRAM FOR INFORMATION GENERATION DEVICE

CROSS-REFERENCE TO RELATED APPLICATIONS

This application is a Continuation Application of U.S. patent application Ser. No. 16/651,612, filed on Mar. 27, 2020, which is a U.S. National Stage entry of PCT Application No: PCT/JP2018/033740, filed on Sep. 12, 2018, which claims priority to Japanese Patent Application No. 2017-192044, filed on Sep. 29, 2017, the contents of which are incorporated herein by reference.

TECHNICAL FIELD

The present application belongs to a technical field of an information generation device, an information generation method, and a program for the information generation device.

BACKGROUND ART

Inter-mobile body communication is performed between mobile bodies and information on the mobile bodies is used for driving support for vehicles. Patent Literature 1 described below discloses a vehicle communication device that divides information into a plurality of kinds of divided information, determines priority order for the divided information, determines the number of times of transmission of information having high priority order, and repeatedly transmits the information having the high priority order.

CITATION LIST

Patent Literature

Patent Literature 1: JP 2014-59651A

SUMMARY OF INVENTION

Technical Problem

However, when various mobile bodies having different control attributes concerning mobile body driving control, for example, different levels of automatic driving are mixed, with the technique described in Patent Literature 1 described above, since requested items of mobile body information are different according to the control attributes, it has been difficult to effectively perform communication with transmission data of inter-mobile body communication having a limited data amount.

Therefore, the present application has been made in view of the problems described above, and an example of an object of the present application is to provide an information generation device and the like that, when generating transmission data of mobile communication having a limited data amount, generate information that can be effectively used by a mobile body on a reception side.

Solution to Problem

In order to achieve the object, an invention described in claim 1 is an information generation device mountable on a mobile body, the information generation device including:

an estimating means that estimates a control attribute concerning driving control for another mobile body existing in a communicable range from a position of the mobile body, the control attribute being a control attribute of mobile bodies relatively large in number; and an information generating means that generates information for transmission transmitted to the other mobile body, the information for transmission including mobile body information of an item prioritized according to the estimated control attribute among a plurality of items of mobile body information including information concerning the driving control for the mobile body.

In addition, an invention described in claim 5 includes: an estimating step in which an estimating means estimates a control attribute concerning driving control for another mobile body existing in a communicable range from a position of a mobile body, the control attribute being a control attribute of mobile bodies relatively large in number; and an information generating step in which an information generating means generates information for transmission transmitted to the other mobile body, the information for transmission including mobile body information of an item prioritized according to the estimated control attribute among a plurality of items of mobile body information including information concerning the driving control for the mobile body.

BRIEF DESCRIPTION OF DRAWINGS

FIG. 7 is a schematic diagram illustrating an example of a database of the vehicle-to-vehicle communication device illustrated in FIG. 6.

FIG. 9 is a schematic diagram illustrating an example of information for transmission.

FIG. 10 is a schematic diagram illustrating an example of information for transmission.

FIG. 13 is a schematic diagram illustrating an example of information for transmission.

FIG. 14 is a schematic diagram illustrating an example of information for transmission.

DESCRIPTION OF EMBODIMENTS

A mode for carrying out the present application will be described with reference to FIG. 1. Note that FIG. 1 is a block diagram illustrating an example of a schematic configuration of an information generation device according to an embodiment.

Figure 1:
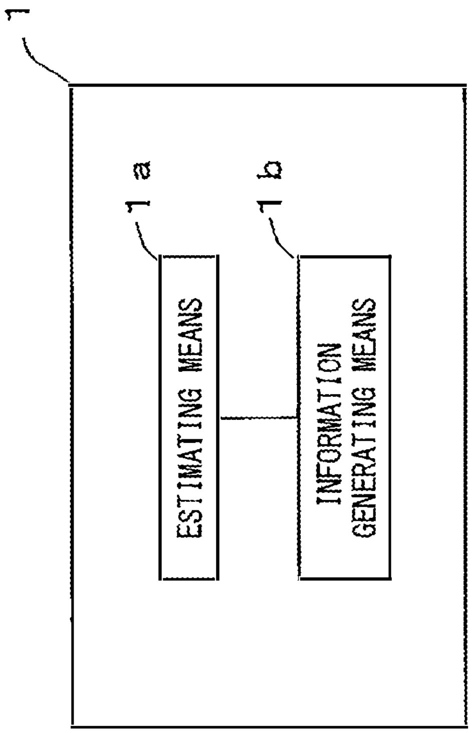
FIG. 1 is a block diagram illustrating an example of a schematic configuration of an information generation device according to an embodiment.

As illustrated in FIG. 1, an information generation device 1 includes an estimating means 1*a* and an information generating means 1*b*.

Examples of the information generation device 1 include a navigation device and a portable terminal device mounted on a mobile body. Examples of the portable terminal device include a portable wireless telephone including a smart phone and a PDA. Examples of the mobile body include an automobile, a bicycle, a person, a railroad, a ship, and an airplane.

The information generation device 1 performs wireless communication with the information generation device 1 of another mobile body.

In this configuration, the estimating means 1*a* estimates a control attribute concerning driving control for another mobile body existing in a communicable range from the position of the mobile body, the control attribute being a control attribute of mobile bodies relatively large in number.

Here, the communicable range from the position of the mobile body, that is, a range in which inter-mobile body communication is possible is a range of, for example, approximately several hundred meters from the mobile body. However, the communicable range is different depending on radio wave intensity, a frequency, and an obstacle.

Examples of the control attribute concerning the driving control for the mobile body include levels of automatic driving and automatic steering defined by agencies and the like in countries. For example, when the mobile body is a vehicle, examples of the level include levels from a level 0 with the lowest level of automation to a level 4 with the highest level of automation. Further, for example, the control attribute may be divided into two attributes of automatic driving and safe driving support. When the control attribute is the automatic driving, for example, the level may be associated with the level 3 and the level 4 and, when the control attribute is the safe driving support, the level may be associated with the level 0 to the level 2. When the control attribute is the automatic driving, for example, the level may be associated with the level 2 to the level 4 and, when the control attribute is the safe driving support, the level may be associated with the level 0 and the level 1.

When the mobile body is the vehicle, the control attribute may be estimated according to a type of a road on which the vehicle is traveling. For example, when the vehicle is traveling on a freeway, a probability that the vehicle causes the automatic driving to function is high; it is estimated that automatic driving vehicles are relatively large in number in a range in which inter-mobile body communication is possible compared with safe driving supporting vehicles and vehicles that do not execute the function of the automatic driving. In addition, the control attribute may be estimated according to a result obtained by performing the inter-mobile body communication. For example, the control attribute are estimated from the number of values (for example, automatic driving levels) of control attribute included in information for transmission transmitted and received from another mobile body existing in a range in which the inter-mobile body communication is possible with the mobile body. In addition, the control attribute may be estimated by a camera mounted on the mobile body that photographs the periphery. For example, the control attribute is estimated according to a car type or the like photographed in the camera.

The information generating means 1*b* generates information for transmission transmitted to another mobile body including mobile body information of an item prioritized according to estimated control attribute among a plurality of items of mobile body information including information concerning driving control for the mobile body.

Here, examples of the items of the mobile body information include an item of mobile body speed, an item of ON/OFF of a light an item of ON/OFF of a windshield wiper equipped in the mobile body, an item of a type of a road on which the mobile body is traveling (a freeway, a general road, a mountain road, a suburb road (for example, a road in a region where a traffic volume is small compared with a city center), a road in a city, or the like), an item of a position of the mobile body by a GPS (Global Positioning System), an item of a relative position with respect to a ground object (an item of high-accuracy position information), an item of a link ID of a link, which is a section of a road connecting nodes on map data, an item of crossing information (a link ID of a three-way junction, a crossroads, or crossing roads, presence or absence of a traffic light, a position, a congestion situation, or the like), an item of attributes (sex, age, and the like) of a driver operating the mobile body, a state (awake or sleepy) of the driver, an item of an automatic driving level, and an item of merging information.

In addition, examples of the item of mobile body information include an item of a state of a lane keep function, an item of a state of a vehicle distance keep function, an item of a forward mobile body tracking function state, and peripheral mobile body information (for example, types and control attributes of mobile bodies in the periphery).

In addition, examples of the item of the mobile body information include an item of destination information and an item of route information by a navigation system.

Further, the item of the merging information is divided into an item of merging scheduled time, an item of a merging scheduled position, an item of link IDs of merging roads and congestion information of the merging roads, and the like. Examples of the item of the merging scheduled time include detailed merging scheduled time (for example, in microsecond units) and un-detailed merging scheduled time (for example, in minute units). Examples of the merging scheduled position include a detailed merging scheduled position (for example, at several millimeters accuracy) and an un-detailed merging scheduled position (for example, in meter units).

Like the item of the merging information, the item of the crossing information may include a detailed item and an un-detailed item concerning a position and the like.

Like the detailed position information, the item concerning the automatic driving is not particularly information necessary for driving in a safe driving support mode and is an item peculiar to the automatic driving.

In addition, the information concerning the driving control for the mobile body is information necessary for the automatic driving of the mobile body. Although the information is different depending on a level of automation, a type (a car model or the like) of the mobile body, and a control mechanism of the mobile body, examples of the information concerning the driving control for the mobile body include mobile body speed, a detailed present position (for example, a relative position with respect to a ground object or a link ID) of the mobile body, detailed merging information (detailed merging scheduled time and a detailed merging scheduled position, and a road type).

Examples of the information for transmission only have to include mobile body information of an item prioritized according to an estimated control attribute. The item of the information for transmission may be divided into an essential item, which is indispensable, and an optional item, which is optional. Examples of the essential item include an item of a control attribute of an own mobile body, a present position of the own mobile body, speed of the own mobile body, and a traveling direction of the own mobile body. When the control attribute is the automatic driving, the essential item may be a detailed present position (a relative position of the mobile body with respect to a ground object) instead of the present position. When the control attribute is the driving in the safe driving support mode, an item of a state of a driver, an item of position information and a traveling direction of a mobile body in the periphery, and the like may be included in the essential item.

The essential item may be included in the item of the information for transmission irrespective of the control attribute. For example, an item of control attribute of the own mobile body and an item of a present position may be essential items irrespective of the control attribute.

Note that the information for transmission has an upper limit in a size of data. Items included in the information for transmission are different depending on data sizes of the items, priority levels of the items, and the like.

Note that the information generation device 1 may acquire information on a moving environment in which the mobile body moves.

Here, examples of the moving environment information include information concerning a place where the mobile body is located (including present position information of the mobile body), information concerning a scene that the mobile body encounters, and information concerning a time in which the mobile body is moving. Examples of the information concerning a place include information concerning a road type such as a freeway, a suburb road, a road in a city, or a mountain road, information concerning a position of the mobile body, crossing information, and merging information. Examples of the information concerning a scene include information concerning weather and a congestion situation. Examples of the information concerning a time include a date, time periods such as day, night, and evening, and a season. In addition, the information concerning a place, which is an example of the moving environment information, may be map information based on the present position information.

Examples of the place exclusive for the mobile body where the mobile body moves include a freeway and an automobile dedicated road on which vehicles travel.

As described above, with the operation of the information generation device 1 according to the embodiment, the mobile body information of the items matched with the control attribute of mobile bodies relatively large in number can be preferentially included in the information for transmission. Therefore, even if a data amount of transmission data is limited, the mobile body on the reception side can effectively use information via the vehicle-to-vehicle communication.

Examples

[1. Configurations and Function Overviews of the Vehicle-to-Vehicle Communication System and the Vehicle-to-Vehicle Communication Device]

(1.1 A Configuration and a Functional Overview of the Vehicle-to-Vehicle Communication System)

Next, a specific example corresponding to the embodiment described above will be described with reference to the figures. Note that the example described below is an example in which the present application is applied to a vehicle-to-vehicle communication system S in a vehicle, which is an example of the mobile body.

Figure 2:
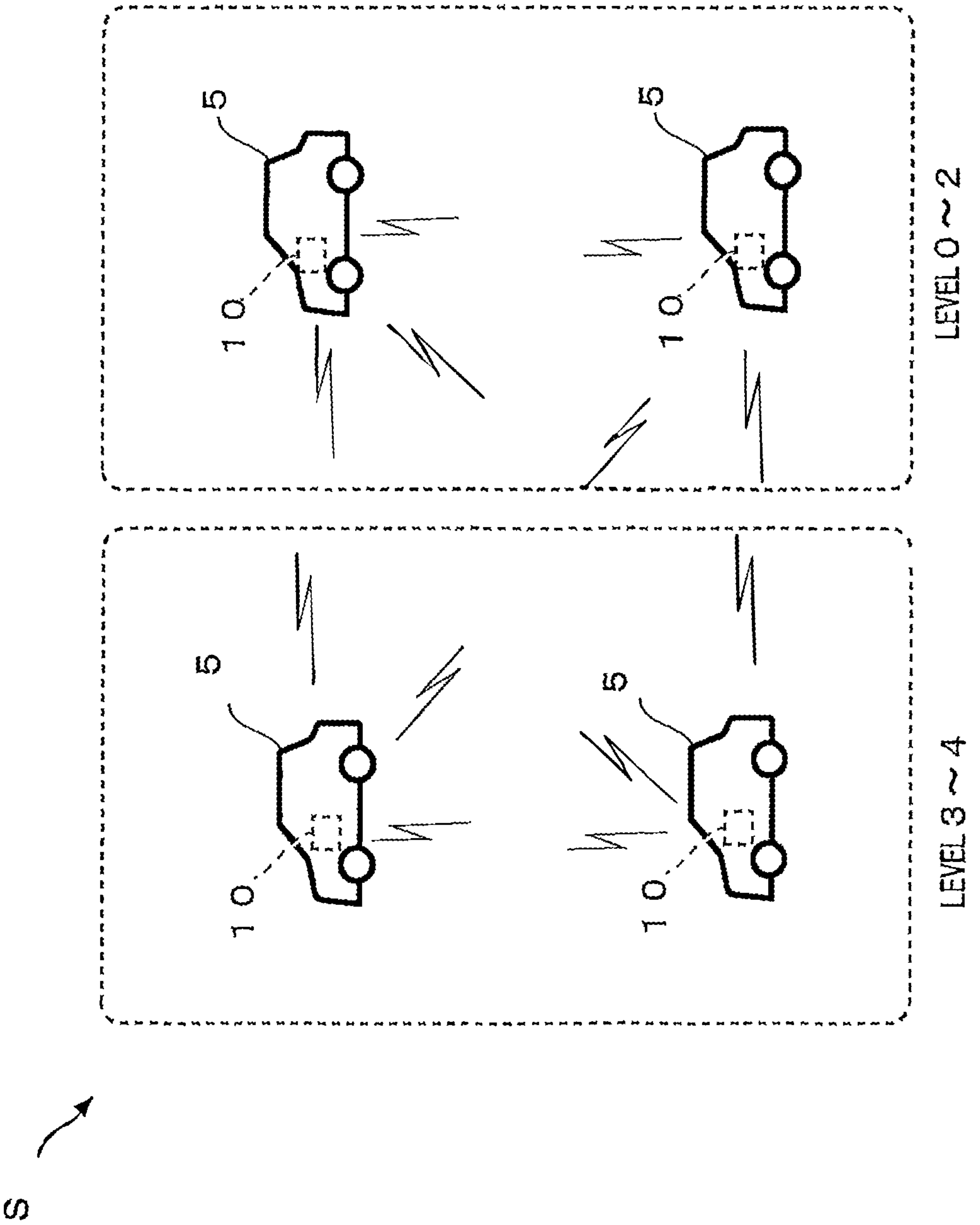
FIG. 2 is a schematic diagram illustrating an example of a schematic configuration of a vehicle-to-vehicle communication system according to an example.
Figure 3:
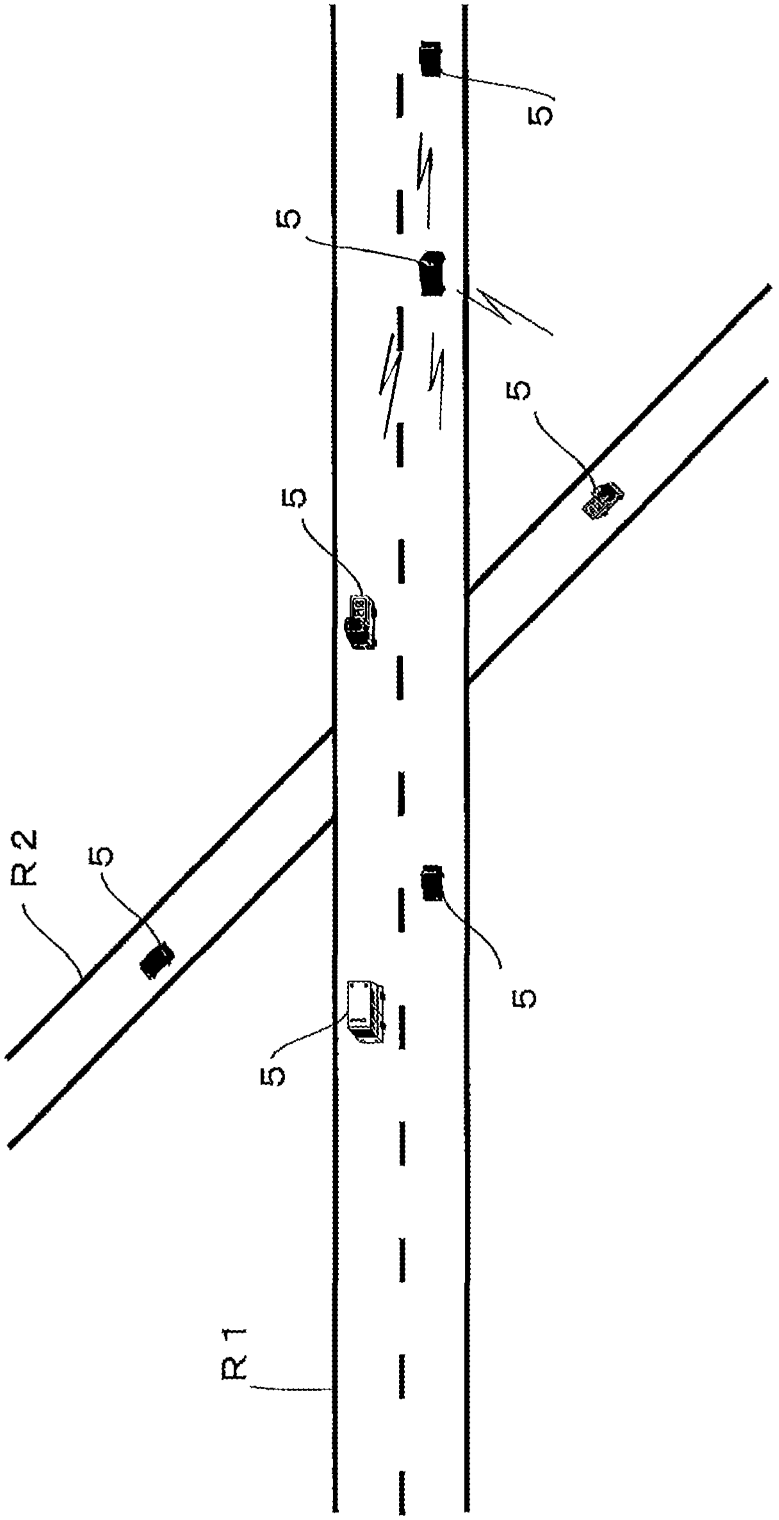
FIG. 3 is a schematic diagram illustrating an example of a traveling environment.
Figure 4:
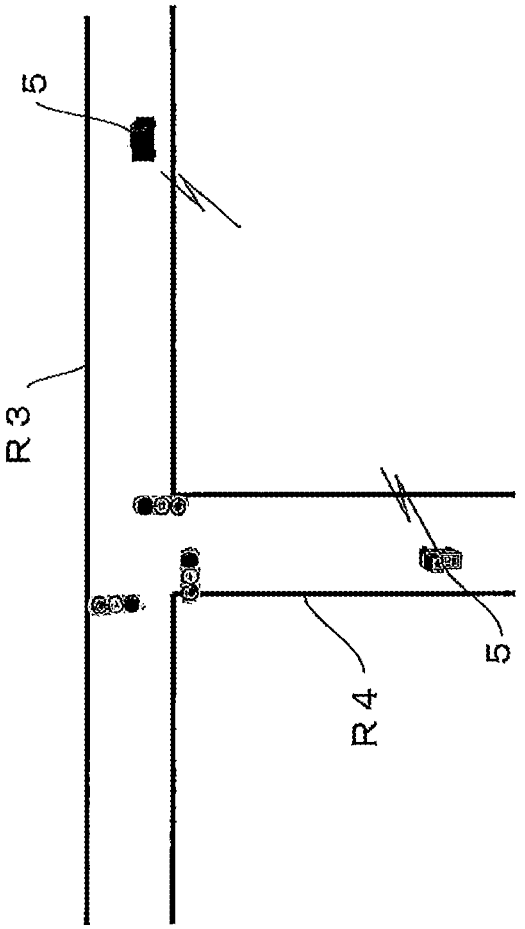
FIG. 4 is a schematic diagram illustrating an example of a traveling environment.
Figure 5:
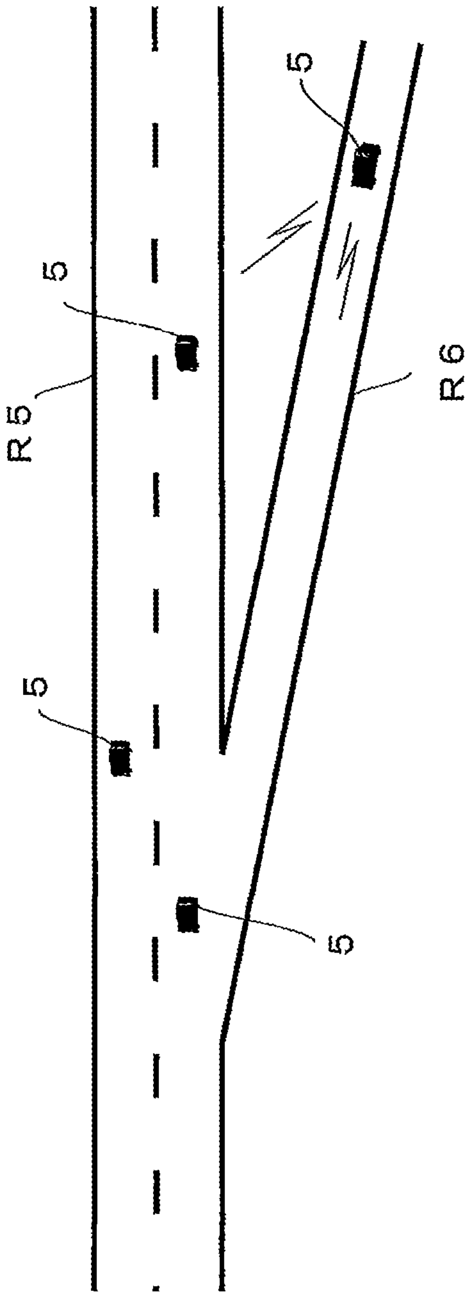
FIG. 5 is a schematic diagram illustrating an example of a traveling environment.

FIG. 2 is a schematic diagram illustrating a configuration example of the vehicle-to-vehicle communication system S. FIG. 3 to FIG. 5 are schematic diagrams illustrating an example of a traveling environment.

As illustrated in FIG. 2, the vehicle-to-vehicle communication system S in this example includes a plurality of vehicles 5 (an example of the mobile body), a control attribute of which is the automatic driving, and a plurality of vehicles 5 (an example of the mobile body), a control attribute of which is the driving in the safe driving support mode. The vehicles 5 are mounted with vehicle-to-vehicle communication devices 10 (an example of the information generation device). Note that the vehicle-to-vehicle communication devices 10 of the vehicles 5 do not have to be completely the same devices because the vehicle-to-vehicle communication devices 10 only have to be able to communicate with one another.

The automatically-driven driving vehicle 5 is, for example, a vehicle, a level of automation of which is the level 3 or the level 4. In the case of the level 3, all of acceleration, steering, and braking are automatically controlled but a user (a driver) of the vehicle 5 performs acceleration, steering, and braking according to a situation. In the case of the level 4, all of acceleration, steering, and braking are automatically controlled.

The vehicle 5 driven in the safe operation support mode is, for example, a vehicle, a level of automation of which is the level 0 to the level 2. In the case of the level 1 or the level 2, any one of acceleration, steering, and braking of the vehicle 5 is automatically controlled. In the case of the level 0, control of acceleration, steering, and braking is not performed for the user of the vehicle 5; For example, information concerning the safe driving support is only notified to the user. In addition, even if the vehicle 5 driven in the safe driving support mode is the vehicle 5 having a function of the automatic driving in the level 3 or the level 4, a vehicle in a situation corresponding to any one level of the level 0 to the level 2 is also included in the vehicle 5.

An assumed number of automatically driven vehicles 5 is different depending on whether a traveling environment (an example of the moving environment) in which the vehicle 5 is traveling is a freeway or a general road. As illustrated in FIG. 3, for example, a road R1 is a freeway and a road R2 is a general road. It is assumed that, in the road R1, which is the freeway, the vehicles 5 executing the function of the automatic driving are relatively large in number. It is assumed that, in the road R2, which is the general road, the vehicles 5 in which the automatic driving is functioning are small in number.

In an example illustrated in FIG. 4, in a traveling environment in which the vehicles 5 are traveling, the vehicles 5 are approaching each other toward a crossing of a road R3 and a road R4. The vehicles 5 near the crossing perform communication including crossing information (an example of the moving environment information).

In an example illustrated in FIG. 5, a traveling environment in which the vehicles 5 are traveling is near a merging point of a road R5 and a road R6. The vehicles 5 near the merging point perform communication including merging information (an example of the moving environment information).

The vehicle-to-vehicle communication devices 10 perform communication each other with radio waves having a predetermined frequency. The vehicle-to-vehicle communication device 10 of an own vehicle 5 specified out of the vehicles 5 and the vehicle-to-vehicle communication device 10 of another vehicle 5 different from the own vehicle 5 perform communication each other with radio waves having the predetermined frequency.

The vehicle-to-vehicle communication device 10 mounted on the automatically driven vehicle 5 provides information concerning driving control to a driving control unit (not illustrated) that performs control of acceleration, steering, and braking of the vehicle 5.

The vehicle-to-vehicle communication device 10 mounted on the vehicle 5 driven in the safe driving support mode provides, in the case of the level 1 or the level 2, information concerning driving control to the driving control unit concerning any one that can be controlled among acceleration, steering, and braking. In the case of the level 0, the vehicle-to-vehicle communication device 10 outputs information concerning the safe driving support as sound or display.

(1.2 A configuration and a Function of the Vehicle-to-Vehicle Communication Device 10)

Next, a configuration and a function of the vehicle-to-vehicle communication device 10 are described with reference to FIG. 6 and FIG. 7.

Figure 6:
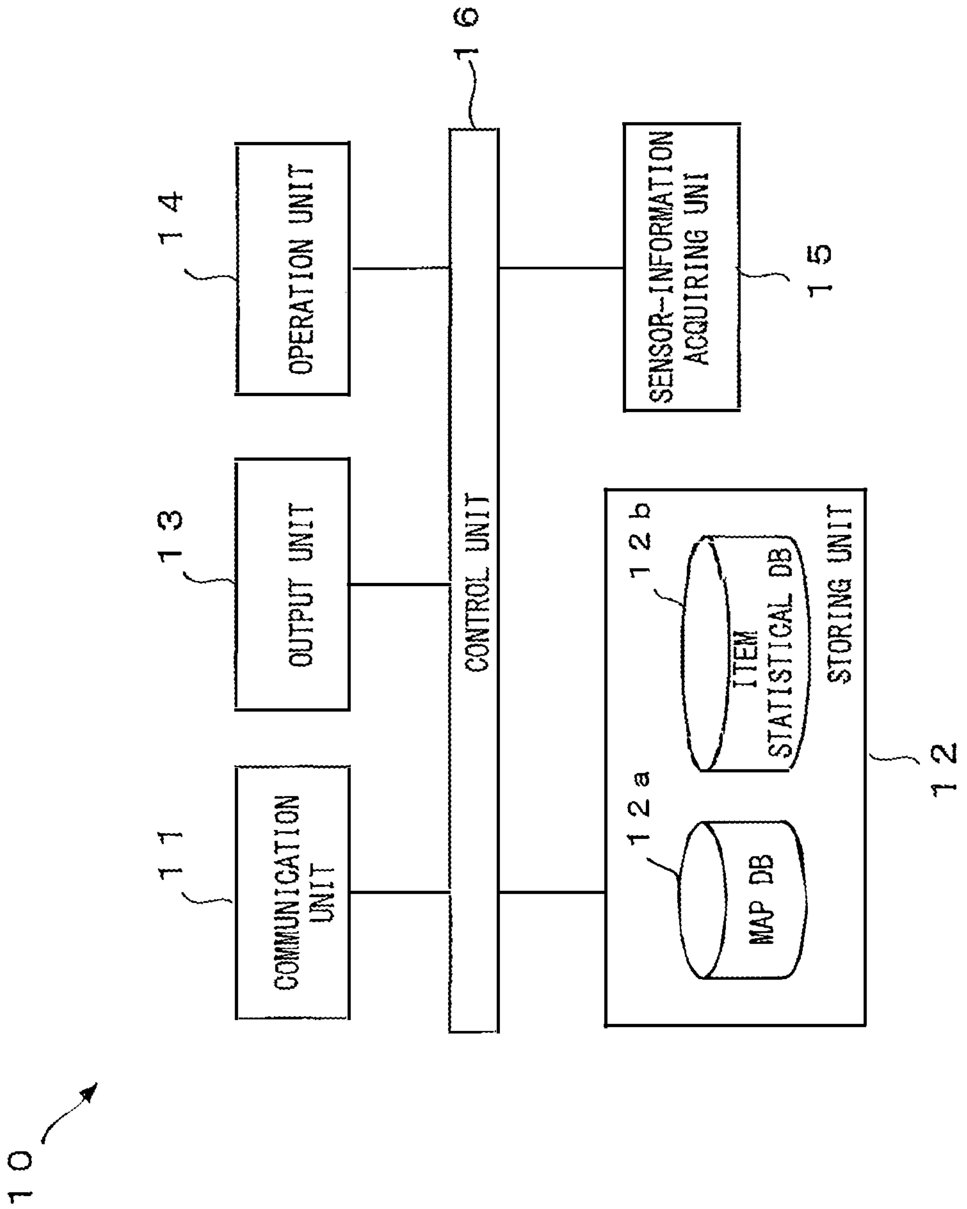
FIG. 6 is a block diagram illustrating an example of a schematic configuration of a vehicle-to-vehicle communication device of an automatic driving vehicle.

FIG. 6 is a block diagram illustrating a configuration example of the vehicle-to-vehicle communication device 10. FIG. 7 is a schematic diagram illustrating an example of a database of the vehicle-to-vehicle communication device illustrated in FIG. 6.

As illustrated in FIG. 6, the vehicle-to-vehicle communication device 10 functioning as a computer includes a communication unit 11, a storing unit 12, an output unit 13, an operation unit 14, a sensor-information acquiring unit 15, and a control unit 16.

The communication unit 11 performs wireless communication by a radio wave for communication with the vehicle-to-vehicle communication device 10 of the other vehicle 5.

The storing unit 12 is configured by, for example, a hard disk drive or a silicon disk drive. The storing unit 12 includes a map database (map DB) 12*a* and an item statistical database (item statistical DB) 12*b*.

In the map database 12*a*, information necessary for navigation such as roads, facilities, crossings, and positions of traffic restrictions is stored. Examples of the information on roads include position information of links (for example, position coordinates of nodes at both ends of the links), distances of the links, road widths, and road names.

As illustrated in FIG. 7, in the item statistical database 12*b*, the number of times of reception of items and the number of times of use of the items are stored in association with item IDs. Items included in information for transmission received from other vehicles are counted for each of the items and values are stored in fields of the numbers of times of reception of the items. Among the values of the items included in the received information for transmission, values of items used for the automatic driving or the driving in the safe driving support mode are counted for each of the items and values are stored in fields of the numbers of times of use of the items.

In the storing unit 12, attribute information of a driver driving the own vehicle such as sex and age of the driver may be registered.

The storing unit 12 stores various programs and the like for controlling the vehicle-to-vehicle communication device 10. Examples of the various programs include an operating system and application software for navigation and music play. Note that the various programs may be acquired via a network such as a wireless communication network or may be recorded in a recording medium such as a CD or a DVD and read via a drive device.

The output unit 13 outputs an image, sound, and the like. The output unit 13 is, for example, an output means such as a car navigation device and is configured by a liquid crystal display element or an EL element, a speaker, and the like.

The sensor-information acquiring unit 15 includes a sensor (an internal sensor) mounted on a vehicle to measure a traveling state and the like of the vehicle itself and a sensor (an external sensor) that measures the outside world of the vehicle, the sensor being an external sensor and acquires information necessary for the automatic driving.

For example, the internal sensor senses acceleration, speed, a traveling direction, a tilt, and the like of the vehicle 5. In addition, the internal sensor is a sensor that detects an angle of a steering wheel, operation states of a brake, a gear, and a windshield wiper, an indicated direction of a direction indicator, an ON/OFF state of a light, and the like. Further, examples of the internal sensor include, specifically, a gyro sensor, an acceleration sensor, a speed sensor, a wheel rotation angle sensor, and a steering angle sensor. Note that a GNSS (Global Navigation Satellite System) positioning system such as a GPS (Global Positioning System) that acquires an absolute position of the vehicle 5 may be included or may not be included in the internal sensor.

In addition, examples of the external sensor include a radar, a traveling space sensor (LIDAR: Light Detection and Ranging, Laser Imaging Detection and Ranging), and a camera that photographs the periphery of a vehicle.

In addition, the sensor-information acquiring unit 15 may include a sensor that receives traffic information provided by a road traffic information communication system (VICS (registered trademark): Vehicle Information and Communication System). The sensor-information acquiring unit 15 includes a timer that measures present time.

In addition, the sensor-information acquiring unit 15 may be configured to acquire an image from a camera that photographs the driver. Further, the sensor-information acquiring unit 15 may include a rainfall sensor.

Note that included sensors are different depending on a control attribute of the vehicle. For example, the sensor-information acquiring unit 15 of the vehicle 5 driven in the safe driving support mode may not include the traveling space sensor.

The operation unit 14 is configured by an operation button or the like. Note that, when the output unit 13 is a display panel of a touch switch type such as a touch panel, the operation unit 14 acquires position information of the output unit 13 that the user touches or approaches.

The control unit 16 includes, for example, a CPU (Central Processing Unit), a ROM (Read Only Memory), and a RAM (Random Access Memory). The control unit 16 controls operations of the units of the vehicle-to-vehicle communication device 10.

[2. Operation of the Vehicle-to-Vehicle Communication Device 10]

Next, operation of the vehicle-to-vehicle communication device 10 according to the example will be described with reference to the figures.

(2.1 An Example of Operation of the Vehicle-to-Vehicle Communication Device 10 During Transmission)

First, an example of operation of the vehicle-to-vehicle communication device 10 during transmission will be described with reference to FIG. 8 to FIG. 10.

Figure 8:
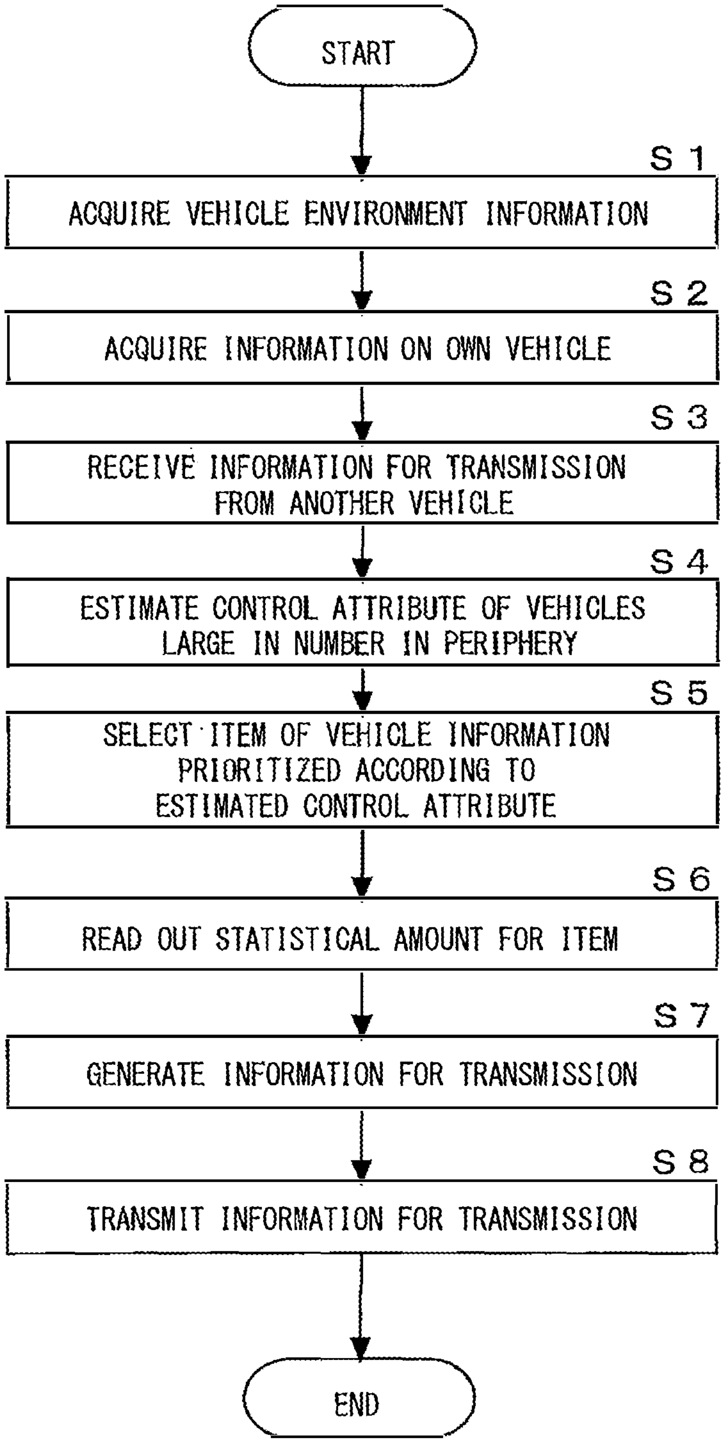
FIG. 8 is a flowchart illustrating an example of operation of the vehicle-to-vehicle communication device during transmission according to the example.

FIG. 8 is a flowchart illustrating an example of operation of the vehicle-to-vehicle communication device 10 during transmission according to the example. FIG. 9 and FIG. 10 are schematic diagrams illustrating examples of information for transmission.

As illustrated in FIG. 8, the vehicle-to-vehicle communication device 10 acquires vehicle environment information (an example of the moving environment information) (step S1). Specifically, the control unit 16 of the vehicle-to-vehicle communication device 10 acquires, from the camera of the sensor-information acquiring unit 15, an image obtained by imaging the periphery of the own vehicle 5. In addition, the control unit 16 acquires, from the present position information and the map information of the sensor-information acquiring unit 15, information on a road type of a road on which the own vehicle 5 is currently traveling.

In addition, the control unit 16 acquires information on present time from the timer of the sensor-information acquiring unit 15. In addition, the control unit 16 acquires traffic information from the sensor-information acquiring unit 15. The control unit 16 acquires information such as a state of a road surface and weather from the sensor-information acquiring unit 15.

Subsequently, the vehicle-to-vehicle communication device 10 acquires information on the own vehicle (step S2). Specifically, the control unit 16 acquires, from the internal sensor of the sensor-information acquiring unit 15, information such as acceleration, speed, a traveling direction, a tilt, an angle of a steering wheel, operation states of a brake, a gear, a windshield wiper, and the like, an indicated direction of a direction indicator, and an ON/OFF state of a light of the own vehicle 5. Note that, in the case of an attribute of the driver, the control unit 16 may read out user attribute information registered in the storing unit 12.

Subsequently, the vehicle-to-vehicle communication device 10 receives information for transmission from another vehicle (step S3). Specifically, the control unit 16 receives, via the communication unit 11, the information for transmission from the other vehicle on a transmission side existing in a range in which a radio wave reaches. Note that, when the own vehicle 5 on a reception side receives the information for transmission from the other vehicle, the number of times of reception is stored in the item statistical database 12*b* for each of items included in the information for transmission.

Subsequently, the vehicle-to-vehicle communication device 10 estimates a control attribute of vehicles large in number in the periphery (step S4). For example, when the road type is a freeway, the control unit 16 estimates that a control attribute of vehicles relatively large in number in the periphery of the own vehicle 5 is the automatic driving. In addition, the control unit 16 may take statistics of values of level items of the automatic driving of the received information for transmission and, when other vehicles having the level 3 or higher levels are large in number, estimate that the control attribute of the vehicles large in number in the periphery of the own vehicle 5 is the automatic driving. For example, concerning a method of taking statistics, the control unit 16 may aggregate control attributes of vehicles for each of vehicle IDs for specifying other vehicles and reflect communication received in the nearest one second at every one second on a change of an item of the information for transmission substantially on a real-time basis. The control unit 16 may take statistics of currently received data of other vehicles on a real-time basis. In addition, concerning the method of taking statistics, the control unit 16 may take statistics using cumulative data from the past linked to a situation such as a road type. In addition, the control unit 16 may estimate control attributes from car types and the like photographed in the camera, aggregate the control attributes, and calculate a control attribute of vehicles relatively large in number in the periphery of the own vehicle 5.

In this way, the vehicle-to-vehicle communication device 10 functions as an example of an estimating means that estimates a control attribute concerning driving control of other mobile bodies existing in a communicable range from the position of the mobile body, the control attribute being a control attribute of mobile bodies relatively large in number. The vehicle-to-vehicle communication device 10 functions as an example of an estimating means that, when the mobile body is moving in a place exclusive for mobile bodies, estimates the control attribute as a control attribute of the automatic driving.

Subsequently, the vehicle-to-vehicle communication device 10 selects, according to the estimated control attribute, an item of prioritized vehicle information (an example of the mobile body information) (step S5). For example, when the estimated control attribute is the automatic driving, the control unit 16 preferentially selects an item of highly accurate position information (a detailed present position, in case of merging, a detailed merging position or the like), an item of highly accurate time information (in case of merging, detailed merging time), and the like necessary for the automatic driving. Note that, when the control attribute of the own vehicle 5 is the driving in the safe driving support mode and the own vehicle 5 does not include a traveling space sensor and cannot acquire highly accurate position information, the control unit 16 may select an item of highly accurate time information or may preferentially select another item such as the control attribute of the own vehicle 5. Note that the control unit 16 may optionally select an item in an allowable range of a data capacity that can be transmitted at a time. In addition, the control unit 16 may select mobile body information itself of an item instead of the item.

On the other hand, when the estimated control attribute is the driving in the safe driving support mode, for example, the control unit 16 preferentially selects position information, which is not highly accurate, an attribute of the driver, a state of the driver, and the like.

Note that, when the estimated control attribute is the driving in the safe driving support mode, the control unit 16 may select not to select the item of the highly accurate position information. This is, for example, a measure taken assuming that, when the estimated control attribute is the safe driving support mode, another vehicle on a reception side does not have an opportunity of using the highly accurate position information. This is because, when the estimated control attribute is the safe driving support mode, preferentially selecting the highly accurate position information as transmission information is against a viewpoint that, when a data capacity that can be transmitted at a time is limited, information that the other vehicle on the reception side can efficiently use is generated.

In this way, the vehicle-to-vehicle communication device 10 functions as an example of a selecting means that selects an item prioritized according to the estimated control attribute among a plurality of items of mobile body information including information concerning the driving control of the mobile body. The vehicle-to-vehicle communication device 10 functions as an example of a selecting means that selects mobile body information of an item prioritized according to the moving environment information among movement information of the plurality of items.

Subsequently, the vehicle-to-vehicle communication device 10 reads out a statistical amount for the item (step S6). Specifically, the control unit 16 refers to the item statistical database 12*b*, reads out the numbers of times of reception (an example of the statistical amount) and the numbers of times of use (an example of the statistical amount) of items, and calculates a frequency of use (an example of the statistical amount) of the number of times of use per one reception.

In this way, the vehicle-to-vehicle communication device 10 functions as an example of an acquiring means that acquires a statistical amount for an item used by another mobile body among the items of the information for transmission.

Subsequently, the vehicle-to-vehicle communication device 10 generates information for transmission (step S7). Specifically, the control unit 16 increases a priority level such that the item selected in step S5 is included in the information for transmission and determines, from a data size of the item, an item to be included in the information for transmission.

Note that, as illustrated in FIG. 9 and FIG. 10, when there are an essential item and an option item, the essential item may be always included in the information for transmission irrespective of a control attribute. For example, when approach information of an emergency vehicle such as an ambulance and route information of traveling of the emergency vehicle are acquired as peripheral vehicle information, the peripheral vehicle information may be given top priority and may be set as the essential item of the information for transmission irrespective of a control attribute. In addition, for example, as illustrated in FIG. 10, even when the control attribute of vehicles large in number in the periphery is the driving in the safe driving support mode, an item of route information of the own vehicle (the vehicle on the transmission side) or driving support information 1 (for example, when the own vehicle is in a state of a vehicle distance keep function, information indicating that the function is executed) may be set as the essential item.

In addition, after determining the essential item, when the item selected in step S5 is not the essential item, the control unit 16 may set an item high in order in the option item as the essential item.

In addition, the control unit 16 may select items high in order having a high frequency of use with respect to reception (for example, high-order three items). The control unit 16 may weigh the items according to frequencies of use and determine an item to be included in the information for transmission. The control unit 16 may weigh the items totally according to whether the items are the item selected in step S5 (an example of the item prioritized according to the control attribute), whether the items are the essential item, and whether the items are the item having a high frequency of use and determine an item to be included in the information for transmission. In this way, the vehicle-to-vehicle communication device 10 may function as an example of a selecting means that selects an item prioritized according to the estimated control attribute and the statistical amount.

When the control attribute of the vehicles large in number in the periphery is estimated as the automatic driving, for example, items are determined as illustrated in FIG. 9. An item of high-accuracy position information of the own vehicle 5 necessary for the automatic driving of another vehicle (a vehicle on a reception side) and an item of a control attribute level of the own vehicle 5 are high in order. Further, as the option item, an item of a lane keep function state, an item of a state of a vehicle distance keep function, and an item of a forward vehicle following function state supplementary necessary for the automatic driving of the other vehicle are included. Note that an item necessary for the driving in the safe driving support mode may be included or may not be included in the items.

When the control attribute of the vehicles large in number in the periphery is estimated as the driving in the safe driving support mode, for example, items are determined as illustrated in FIG. 10. For example, in the essential item, an item of a driver state of the own vehicle 5 and an item of peripheral vehicle information (an example of the peripheral mobile body information) are high in order. An item of destination information and an item of route information of the own vehicle 5 are included in the option item.

Subsequently, the control unit 16 acquires information corresponding to the determined item to be included in the information for transmission. For example, in the case of an item of a detailed present position, the control unit 16 acquires information on the detailed present position acquired in step S2. In the case of an item of an attribute of the driver, the control unit 16 acquires information registered in the storing unit 12. In the case of an item of a state of the driver, the control unit 16 determines a state of the driver from an operation state of a steering wheel, an image obtained by photographing the driver, and the like.

Subsequently, the control unit 16 includes identification information of the own vehicle 5 in a header and generates information for transmission in the order of the determined items such as an item ID, a data size, a value of data, the next item ID, the data size, and the value of data.

In this way, the vehicle-to-vehicle communication device 10 functions as an example of an information generating means that generates information for transmission to be transmitted to another mobile body, the information for transmission including mobile body information of an item prioritized according to the estimated control attribute among the plurality of items of the mobile body information including the information concerning the driving control for the mobile body. The vehicle-to-vehicle communication device 10 functions as an example of an essential-item selecting means that selects an essential item indispensable irrespective of the estimated control attribute. The vehicle-to-vehicle communication device 10 functions as an example of an information generating means that generates information for transmission including mobile body information of the essential item, which is indispensable.

Subsequently, the vehicle-to-vehicle communication device 10 transmits the information for transmission (step S8). Specifically, the control unit 16 broadcasts, via the communication unit 11, the information for transmission from the own vehicle 5 on the transmission side to the vehicle-to-vehicle communication device 10 of the other vehicle on the reception side. The vehicle-to-vehicle communication 10 functions as an example of a communication means that transmits the information for transmission.

(2.2 An Example of Operation of the Vehicle-to-Vehicle Communication Device During Reception)

Next, an example of operation of the vehicle-to-vehicle communication device during reception will be described with reference to FIG. 11.

Figure 11:
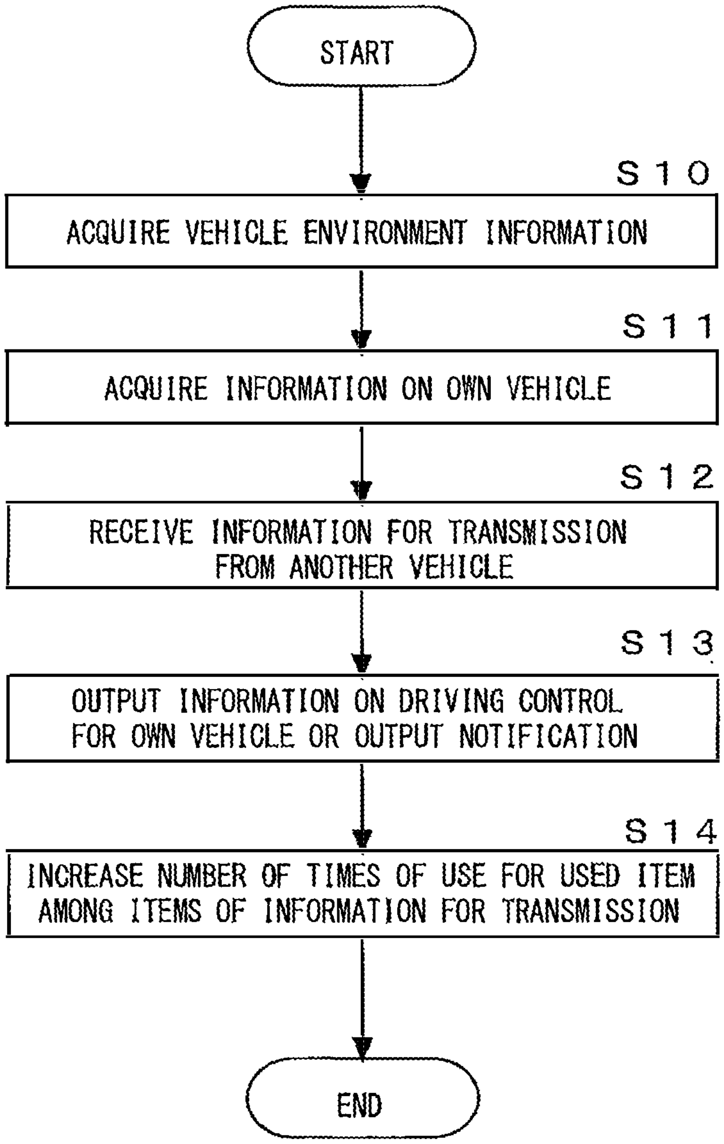
FIG. 11 is a flowchart illustrating an example of operation of the vehicle-to-vehicle communication device during reception according to the example.

FIG. 11 is a flowchart illustrating an example of operation of the vehicle-to-vehicle communication device during reception according to the example.

As illustrated in FIG. 11, the vehicle-to-vehicle communication device 10 acquires vehicle environment information as at step S1 (step S10).

Subsequently, the vehicle-to-vehicle communication device 10 acquires information on the own vehicle 5 as at step S2 (step S11).

Subsequently, the vehicle-to-vehicle communication device 10 receives information for transmission from another vehicle as at step S3 (step S12).

Subsequently, the vehicle-to-vehicle communication device 10 outputs information concerning driving control for the own vehicle 5 or outputs a notification (step S13). When the own vehicle 5 has the control attribute of the automatic driving, the control unit 16 outputs, to the driving control unit, based on information of a necessary item among the vehicle environment information, the information concerning the own vehicle, and the information for transmission received from the other vehicle, information concerning driving control about how driving of the own vehicle 5 is controlled from a present position, a traveling direction, speed, and the like.

When the own vehicle 5 has the control attribute of the driving in the safe driving support mode, the control unit 16 outputs, to the output unit 13, information necessary for a notification to the driver, based on information of a necessary item among the vehicle environment information, the information on the own vehicle, and the information for transmission received from the other vehicle. For example, when the own vehicle 5 is too close to a forward vehicle, the output unit 13 outputs a warning of approach. The control unit 16 compares information such as position information, speed and traveling direction of the other vehicle in the information for transmission received from the other vehicle and position information and information on a traveling direction of the own vehicle 5. When the vehicles are approaching at a merging point, a crossing, or the like, the output unit 13 outputs a warning. Examples of the warning include notification to the driver by, for example, warning display by an image of a navigation device or the like included in the own vehicle or warning guidance by voice from a speaker included in the own vehicle.

Subsequently, the vehicle-to-vehicle communication device 10 increases the number of times of use for a used item among the items of the information for transmission (step S14). When the own vehicle 5 has the control attribute of the automatic driving and the control unit 16 controls the driving of the own vehicle 5 using detailed position information of the other vehicle at a merging point, the control unit 16 increases, based on a used item ID, a count number of the number of times of use of an item of the detailed position information in the item statistical database 12*b*.

When the own vehicle 5 has the control attribute of the driving in the safe driving support mode and notifies that the other vehicle is approaching at a merging point, a crossing, or the like, the control unit 16 increases, based on the used item ID, in the item statistical database 12*b*, count numbers of the numbers of times of use of items of information such as position information, speed and a traveling direction of the other vehicle in the information for transmission received from the other vehicle.

As described above, with the operation according to the example, vehicle information of items matched with a control attribute of vehicles relatively large in number in the periphery can be preferentially included in the information for transmission. Therefore, even if a data amount of transmission data is limited, information can be effectively used in the vehicle on the reception side via vehicle-to-vehicle communication.

In addition, when an item indispensable irrespective of a control attribute is selected and information for transmission including vehicle information of the indispensable item is generated, since the essential item is always included in the information for transmission, information can be effectively used irrespective of whether a control attribute of the vehicle on the reception side is the automatic driving or the driving in the safe driving support mode.

In addition, when a statistical amount for a used item among the items of the information for transmission is acquired and an item prioritized according to the statistical amount and the control attribute is selected, vehicle information of an item statistically having a high value of use can be effectively communicated.

In addition, when the own vehicle 5 is travelling on a vehicle dedicated road such as a freeway, if it is assumed that the own vehicle 5 has the control attribute of the automatic driving, it is highly likely that the automatic driving is functioning on the vehicle dedicated road. Therefore, communication can be effectively performed with a vehicle in which the automatic driving is functioning.

(2.3 A Second Example of the Operation of the Vehicle-to-Vehicle Communication Device 10 During Transmission)

Next, a second example of the operation of the vehicle-to-vehicle communication device 10 during transmission will be described with reference to FIG. 12 to FIG. 14. Note that operation different from operation in the example described above is mainly described.

Figure 12:
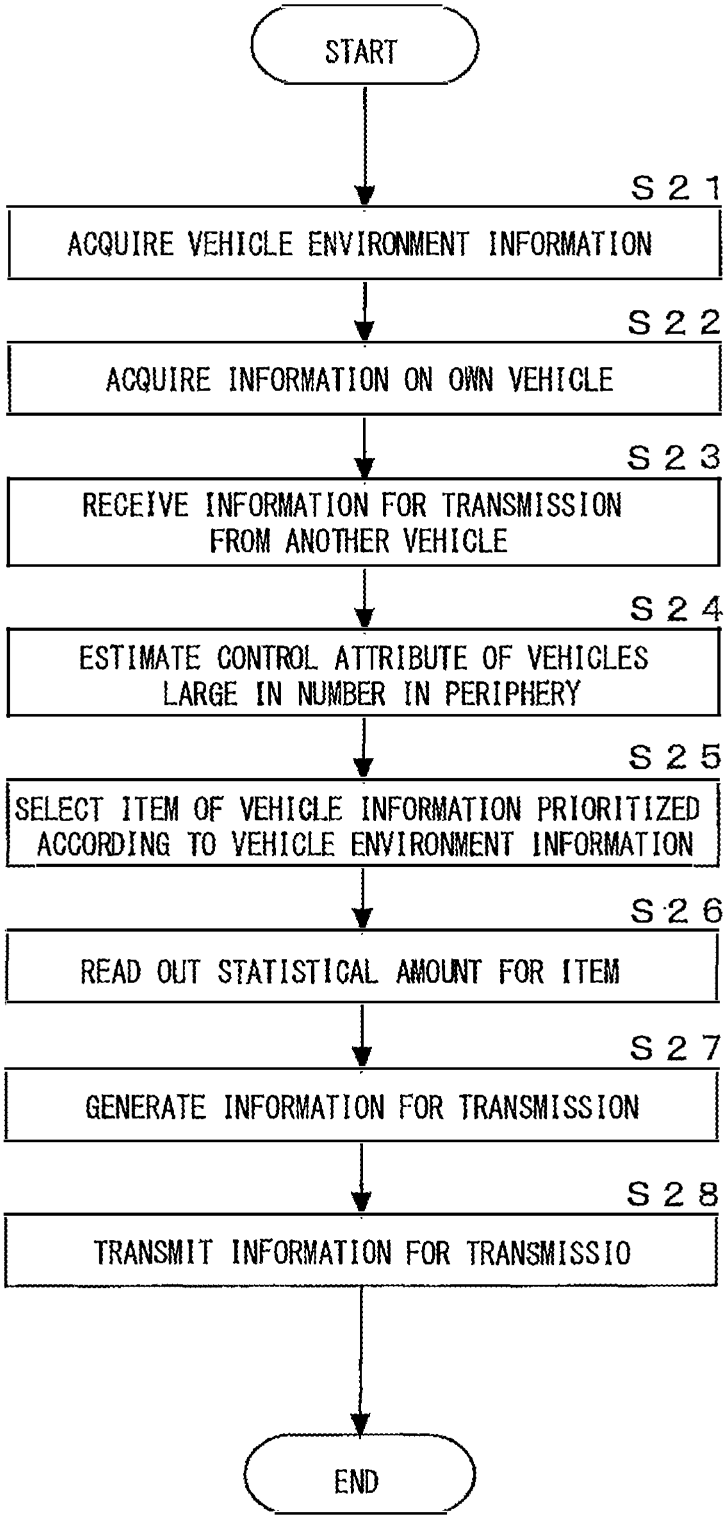
FIG. 12 is a flowchart illustrating a second example of the operation of the vehicle-to-vehicle communication device during transmission.

FIG. 12 is a flowchart illustrating the second example of the operation of the vehicle-to-vehicle communication device during transmission. FIG. 13 and FIG. 14 are schematic diagrams illustrating an example of information for transmission.

As illustrated in FIG. 12, the vehicle-to-vehicle communication device 10 acquires vehicle environment information (step S21).

In this way, the vehicle-to-vehicle communication device 10 functions as an example of an acquiring means that acquires information on a moving environment in which the mobile body moves.

Subsequently, the vehicle-to-vehicle communication device 10 acquires information on the own vehicle (step S22).

Subsequently, the vehicle-to-vehicle communication device 10 receives information for transmission from another vehicle (step S23).

Subsequently, the vehicle-to-vehicle communication device 10 estimates a control attribute of vehicles large in number in the periphery (step S24). Note that this step may be omitted.

Subsequently, the vehicle-to-vehicle communication device 10 selects an item of vehicle information prioritized according to vehicle environment information (an example of the moving environment information) (step S25). For example, when a present position and map information are compared and the own vehicle 5 is near a merging point, the control unit 16 preferentially selects an item of merging information. In addition, when the own vehicle 5 is near a crossing, the control unit 16 may preferentially select an item of crossing information. In addition, when the own vehicle 5 is traveling on a freeway, the control unit 16 may preferentially select an item concerning the automatic driving such as an item of a detailed present position. In addition, when the own vehicle 5 is traveling on a suburb road where a traffic volume is small judging from a congestion situation, the control unit 16 may not preferentially select the item of the detailed present position. In addition, when the sensor-information acquiring unit 15 determines that it is raining, the control unit 16 may preferentially select an item of ON/OFF of the windshield wiper. In addition, when the sensor-information acquiring unit 15 determines that a time period is the evening, the control unit 16 may preferentially select an item of ON/OFF of the light of the vehicle.

In this way, the vehicle-to-vehicle communication device 10 functions as an example of a selecting means that selects an item prioritized according to the moving environment information among the plurality of items of the mobile body information including the information concerning the driving control for the mobile body. The vehicle-to-vehicle communication device 10 functions as an example of a selecting means that, when the mobile body is moving in a place exclusive for mobile bodies, preferentially selects an item concerning the automatic driving. The vehicle-to-vehicle communication device 10 functions as an example of a selecting means that selects mobile body information of an item prioritized according to a result obtained by comparing present position information and map information among the mobile body information of the plurality of items of the mobile body.

Subsequently, the vehicle-to-vehicle communication device 10 reads out a statistical amount for the item (step S26).

In this way, the vehicle-to-vehicle communication device 10 functions as an example of an acquiring means that acquires a statistical amount for a used item among the items of the information for transmission.

Subsequently, the vehicle-to-vehicle communication device 10 generates information for transmission (step S27). Specifically, the control unit 16 increases a priority level such that the item selected in step S25 is included in the information for transmission and determines, from a data size of the item, an item to be included in the information for transmission.

Note that, as illustrated in FIG. 13 and FIG. 14, when there are an essential item and an option item, the essential item may be always included in the information for transmission. For example, as illustrated in FIG. 14, even when the control attribute is the driving in the safe driving support mode and an item of a driver state is prioritized, the item of the control attribute level may be set as the essential item.

In addition, as illustrated in FIG. 13 and FIG. 14, after determining the essential item, when the item selected in step S25 is not the essential item, the control unit 16 may set an item high in order in the option item as the essential item.

When the item of ON/OFF of the light of the vehicle (an example of the item prioritized according to the moving environment information) is selected in step S25, as illustrated in FIG. 13, the item of ON/OFF of the light of the vehicle is high in order in the option item. Note that, as illustrated in FIG. 13, the item of the high-accuracy position information and the item of the control attribute level, which are essential items, are examples of the item indispensable irrespective of the item prioritized according to the moving environment information.

When the item of ON/OFF of the windshield wiper (an example of the item prioritized according to the moving environment information) is selected in step S25, as illustrated in FIG. 14, the item of ON/OFF of the windshield wiper is high in order in the option item. Note that, as illustrated in FIG. 14, the item of the driver state and the item of the peripheral vehicle information, which are essential items, are examples of the item indispensable irrespective of the item prioritized according to the moving environment information.

In addition, the control unit 16 may select items high in order having a high frequency of use with respect to reception (for example, high-order three items). The control unit 16 may weigh the items according to frequencies of use and determine an item to be included in the information for transmission. The control unit 16 may weigh the items totally according to whether the items are the item selected in step S25 (an example of the item prioritized according to the moving environment information), whether the items are the essential item, and whether the items are the item having a high frequency of use and determine an item to be included in the information for transmission. In this way, the vehicle-to-vehicle communication device 10 may function as an example of a selecting means that selects an item prioritized according to the statistical amount and the moving environment information.

Further, when the control attribute of the vehicles large in number in the periphery is estimated as the automatic driving in step S24, for example, items are determined as illustrated in FIG. 13. The item of the high-accuracy position information and the item of the control attribute level necessary for the automatic driving are high in order. Then, in the option item, the item of ON/OFF of the light of the vehicle, which is the item selected in step S25, is high in order. The item of the lane keep function state, the item of the state of the vehicle distance keep function, and then item of the forward vehicle following function state supplementary necessary for the automatic driving are included.

Note that, when the own vehicle 5 is near a merging point, the item of the merging information may be high in order in the essential item.

When the control attribute of the vehicles large in number in the periphery is estimated as the driving in the safe driving support mode in step S24, for example, items are determined as illustrated in FIG. 14. For example, in the essential item, the item of the driver state and the item of the peripheral vehicle are high in order. Then, in the option item, the item of ON/OFF of the windshield wiper of the vehicle, which is the item selected in step S25, is high in order. The item of the destination information and the item of the route information are included.

By weighting the items totally according to whether the items are the item selected in step S25, whether the items are the essential item, whether the items are the item having the high frequency of use, and the estimated control attribute of the vehicles large in number in the periphery, the control unit 16 may determine an item to be included in the information for transmission.

After determining the item to be included in the information for transmission, the control unit 16 acquires information corresponding to the determined item to be included in the information for transmission and generates information for transmission.

In this way, the vehicle-to-vehicle communication device 10 functions as an example of an information generating means that generates information for transmission transmitted to the other mobile body, the information for transmission including mobile body information of an item prioritized according to the moving environment information among the plurality of items concerning the mobile body. The vehicle-to-vehicle communication device 10 functions as an information generating means that generates information for transmission transmitted to another mobile body capable of performing inter-mobile body communication with the mobile body, the information for transmission including mobile body information of the item selected by the selecting means. The vehicle-to-vehicle communication device 10 functions as an example of an essential-item selecting means that selects an item indispensable irrespective of an item prioritized according to the moving environment information. The vehicle-to-vehicle communication device 10 functions as an example of an information generating means that generates information for transmission including the mobile body information of the indispensable item. The vehicle-to-vehicle communication device 10 functions as an example of an information generating means that generates the information for transmission including the mobile body information of the selected item. The vehicle-to-vehicle communication device 10 functions as an example of an information generating means that generates, as mobile body information of the prioritized item, information for transmission including at least mobile body information of the item concerning the automatic driving.

Subsequently, the vehicle-to-vehicle communication device 10 transmits the information for transmission (step S28).

As described above, with the operation according to the example, the vehicle information of the item matched with the vehicle environment information can be preferentially included in the information for transmission. Therefore, even if a data amount of transmission data is limited, information can be effectively used by the mobile body on the reception side via the vehicle-to-vehicle communication.

When an item indispensable irrespective of an item prioritized according to the moving environment information is selected and information for transmission including mobile body information of the indispensable essential item is generated, since the essential item is always included in the information for transmission, information can be effectively used in the mobile body on the reception side.

When a statistical amount for a used item among the items of the information for transmission is acquired and an item prioritized according to the statistical amount and the vehicle environment information is selected, vehicle information of an item statistically having a high value of use can be included. Therefore, information can be effectively used in the mobile body on the reception side.

In addition, when the own vehicle 5 is travelling on a vehicle dedicated road such as a freeway, if an item concerning the automatic driving is preferentially selected, it is highly likely that the automatic driving is functioning on the vehicle dedicated road. Therefore, information can be effectively used by the mobile body on the reception side in which the automatic driving is functioning.

REFERENCE SIGNS LIST

1 information generation device
1*a* estimating means
1*b* information generating means
5 vehicle (mobile body)
10 vehicle-to-vehicle communication device (information generation device)
S vehicle-to-vehicle communication system

The invention claimed is:

1. An information generation device mountable on a mobile body, the information generation device comprising:
at least one memory configured to store a program; and
a central processing unit (CPU) coupled to the memory and configured to execute a program to:
acquire moving environment information concerning a moving environment in which the mobile body moves;
acquire statistical amounts for each of a plurality of items of mobile body information including information received from another mobile body, the statistical amounts including a number of times of reception of said each of the plurality of items and a number of times of use of said each of the plurality of items, and calculate a frequency of use of the number of times of use per one reception;
select one or more prioritized items from the plurality of items prioritized according to the moving environment information and the statistical amounts including the frequency of use;
select one or more essential items of the mobile body information that are indispensable, irrespective of the one or more prioritized items; and
generate information for transmission transmitted to the another mobile body, the information for transmission including the mobile body information of the mobile body according to the one or more essential items and the one or more prioritized items.

2. The information generation device according to claim 1, wherein the CPU is further configured to execute the program to:
select mobile body information of an item prioritized according to the moving environment information among the mobile body information of the plurality of items, the moving environment information further including present position information of the mobile body and map information based on the present position information;
select mobile body information of an item prioritized according to a result obtained by comparing present position information and map information among the mobile body information of the plurality of items of the mobile body; and
generate the information for transmission including the mobile body information of the selected item.

3. The information generation device according to claim 2, wherein the CPU is further configured to execute the program to:
select an item of merging information preferentially when the mobile body is near a merging point, and/or select an item of crossing information when the mobile body is near a crossing, by comparing the present position information and the map information.

4. The information generation device according to claim 1, wherein the CPU is further configured to execute the program to:
generate, as the mobile body information of the prioritized items, information for transmission including at least mobile body information of said each of the plurality of items concerning an automatic driving, when the mobile body is moving in a place exclusive for mobile bodies.

5. The information generation device according to claim 1, wherein the CPU is further configured to execute the program to:
transmit the information for transmission to a communication device mounted on other mobile bodies, including the another mobile body, existing in a communicable range from a position of the mobile body.

6. A computer-readable recording medium which records a program for an information generation device, the program causing a central processing unit to function as the information generation device according to claim 1.

7. The information generation device according to claim 1, wherein the moving environment information includes information concerning weather.

8. An information generation method, comprising:

acquiring moving environment information concerning a moving environment in which a mobile body moves by a central processing unit (CPU);

acquiring statistical amounts for each of a plurality of items of mobile body information including information received from another mobile body, the statistical amounts including a number of times of reception of said each of the plurality of items and a number of times of use of said each of the plurality of items, and calculate a frequency of use of the number of times of use per one reception;

selecting one or more prioritized items from the plurality of items prioritized according to the moving environment information and the statistical amounts including the frequency of use;

selecting one or more essential items of the mobile body information that are indispensable, irrespective of the one or more prioritized items; and generating information for transmission transmitted to the another mobile body by the CPU, the information for transmission including the mobile body information of the mobile body according to the one or more essential items and the one or more prioritized items.

9. The information generation method according to claim 8, wherein the moving environment information includes information concerning weather.

* * * * *